(12) United States Patent
Yi

(10) Patent No.: US 10,048,541 B2
(45) Date of Patent: Aug. 14, 2018

(54) LIQUID CRYSTAL DEVICE

(71) Applicant: BenQ Materials Corporation, Taoyuan (TW)

(72) Inventor: Chun-Chieh Yi, Taoyuan (TW)

(73) Assignee: BENQ MATERIALS CORPORATION, Taoyuan (TW)

( * ) Notice: Subject to any disclaimer, the term of this patent is extended or adjusted under 35 U.S.C. 154(b) by 5 days.

(21) Appl. No.: 15/405,287

(22) Filed: Jan. 12, 2017

(65) Prior Publication Data

US 2017/0363913 A1    Dec. 21, 2017

(30) Foreign Application Priority Data

Jun. 20, 2016   (TW) .............................. 105119350 A

(51) Int. Cl.
| | | |
|---|---|---|
| *G02F 1/1333* | (2006.01) | |
| *G02F 1/1337* | (2006.01) | |
| *C09K 19/56* | (2006.01) | |
| *C09K 19/54* | (2006.01) | |
| *C08F 122/14* | (2006.01) | |

(52) U.S. Cl.
CPC ...... *G02F 1/133719* (2013.01); *C08F 122/14* (2013.01); *C09K 19/542* (2013.01); *C09K 19/56* (2013.01)

(58) Field of Classification Search
CPC ..... C09K 19/56; C09K 19/542; G02F 1/1333; G02F 1/133719; C08F 122/14
See application file for complete search history.

(56) References Cited

U.S. PATENT DOCUMENTS 6,369,871 B1 *   4/2002   Hanada ................. G02F 1/1333
                                                                    349/158
2017/0363913 A1*  12/2017  Yi ..................... G02F 1/133719

FOREIGN PATENT DOCUMENTS

TW            201127941 A1       8/2011

* cited by examiner

*Primary Examiner* — Geraldina Visconti
(74) *Attorney, Agent, or Firm* — Chun-Ming Shih

(57) ABSTRACT

A liquid crystal device having higher transmittance and lower driving voltage is provided. The liquid crystal device comprises a first substrate having a first conductive layer, a second substrate having a second conductive layer, a first alignment layer and a liquid crystal layer. The first alignment layer comprises a liquid crystal alignment treatment agent and a methacryloyloxy-containing silane and is disposed on the first conductive layer of the first substrate. The liquid crystal layer comprises a liquid crystal material and a bifunctional-group resin and is disposed on the first alignment layer. The second substrate having a second conductive layer is disposed on the liquid crystal layer.

10 Claims, 2 Drawing Sheets

LIQUID CRYSTAL DEVICE

This application claims the benefit of TW application No. 105119350, filed on Jun. 20, 2016, and the entirety of which is incorporated by reference herein.

BACKGROUND OF THE INVENTION

Field of Invention

The present invention relates to a liquid crystal device and particularly relates to a liquid crystal device exhibiting high transmittance and low driving voltage.

Description of the Related Art

With the increasing demand for smart windows, the application of light regulating devices or optical switchable devices is consequently developed. Recently, the liquid crystal (LC) switchable display utilizing polymer dispersed liquid crystal (PDLC) or polymer network liquid crystal (PNLC) has been on the market. The switchable modes of the LC switchable display is obtained by switching the orientation of the liquid crystal molecules under the action of electric field to the ordered orientation to exhibit transparent state or to random orientation to exhibit opaque state. This LC switchable display is configured by disposing a LC layer between a pair of substrates with electrodes formed thereon and driven by applying a voltage therebetween to switch the orientation of the liquid crystal molecules to exhibit transparent or opaque state on the switchable display. This LC switchable display are advantages of fast switching time and instant privacy. This LC switchable display can be packaged by glass for acting as a construction material or packaged by flexible materials to form a thin film for attaching onto existing windows, glass partitions without changing the existing construction.

It is known that the PDLC or PNLC switchable display can work as direct mode LC switchable display and reverse mode LC switchable display. In a direct mode LC switchable display, the liquid crystal molecules are oriented randomly in absence of applied voltage to cause the light scattering to appear opaque and are oriented in order under applying a proper voltage to appear transparent. However, it is necessary to apply a voltage to maintain the transparent appearance when the direct mode LC switchable display is worked. Thus, the working cost is increased since extra voltage is necessary to apply to main the transparent state of the LC switchable device used as a window for a long time.

Different from the direct mode LC switchable display, the reverse mode LC switchable display is normally transparent in the absence of applied voltage, and becomes opaque in the presence of applied voltage. The common reverse mode LC switchable display is configured by disposed a layer of 6-10 μm of liquid crystal and UV cured resin between two conductive indium-tin oxide glass (ITO Glass) with alignment layers formed thereon. The reverse mode LC switchable display is normally transparent in the absence of applied voltage. The transmittance of the LC switchable display will increase along with the increasing addition amount of the resin. However, as the addition amount of the resin is increased, the driving voltages for switching the display from transparent state to opaque state will thus be increased. As the addition amount of the resin is decreased, the adhesion provided by the resin is insufficient to stable the alignment of the liquid crystal and result in decreasing of the transmittance of the transparent state.

Accordingly, a novel reverse mode LC switchable display exhibiting high transmittance and low driving voltage is highly expected.

SUMMARY OF THE INVENTION

The present invention is to provide a novel liquid crystal device with an alignment layer comprising reactive functional groups. The present LC device requires low driving voltage and exhibits a good stable transmittance in transparent state.

The present invention is to provide a liquid crystal device. The liquid crystal device comprises a first substrate comprising a first conductive layer, a second substrate comprising a second conductive layer, a first alignment layer and a liquid crystal layer. The first alignment layer is disposed on the first conductive layer of the first substrate, which comprises a liquid crystal alignment treating agent and a methacryloyloxy-containing silane. The liquid crystal layer is disposed on the first alignment layer, which comprises a liquid crystal material and a bifunctional-group resin. The second substrate with a second conductive layer is disposed on the liquid crystal layer.

In one preferred embodiment of the present invention, the methacryloyloxy-containing silane is selected from one of the group consisting of γ-methacryloxypropyltrimethoxysilane, γ-methacryloxypropyltriisopropoxysilane and γ-methacryloxypropyltriethoxysilane or the like or the combinations thereof.

In one preferred embodiment of the present invention, the alignment layer comprises 1 to 3 parts by weight of methacryloyloxy-containing silane per 100 parts by weight of the liquid crystal alignment treating agent.

In one preferred embodiment of the present invention, the liquid crystal alignment treating agent is selected from one of the group consisting of acrylic polymers, methacrylic polymers, novolak resins, polyhydroxystyrenes, polyimide precursors, polyimides, polyamides, polyesters, celluloses, and polysiloxanes or the like or the combinations thereof.

In one preferred embodiment of the present invention, the bifunctional-group resin is selected from one of the group consisting of 1,6-hexanediol diacrylate (HDDA), triethylene glycol diacrylate (TEGDA), 1,9-nonanediol diacrylate (1,9-NDDA), dipropylene glycol diacrylate (DPGDA), ethoxylated bisphenol A diacrylate (BPA4EODA), hydroxypivalylhydroxypivalatediacrylate (HPHPDA), and polyethylene glycol, polyethyleneglycol (200) diacrylate (PEG(200)DA) or the likes and the combination thereof.

In one preferred embodiment of the present invention, the liquid crystal layer comprises 7 to 9 parts by weight of the bifunctional-group resin per 100 parts by weight of the liquid crystal layer.

In one preferred embodiment of the present invention, the weight average molecular weight (Mw) of the bifunctional-group resin is less than 400.

In one preferred embodiment of the present invention, the bifunctional-group resin is blended with a photoinitiator.

In one preferred embodiment of the present invention, the first substrate and the second substrate are independently a glass substrate or a plastic substrate.

In one preferred embodiment of the present invention, the liquid crystal device further comprises a second alignment layer disposed between the second substrate and the liquid crystal layer.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings, the structure of the apparatus known only schematically depicted in FIG.

One aspect of the present invention is to provide a liquid crystal device and particularly, a liquid crystal device exhibiting high transmittance and low driving voltage.

Figure 1A:
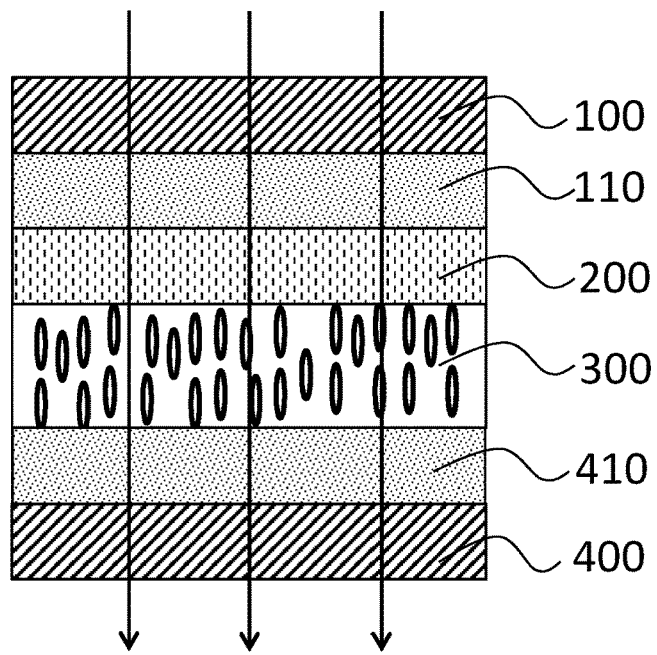
FIGS. 1A to 1B are cross-sectional views of the liquid crystal device of one preferred embodiment of the present invention before and after a predetermined voltage is applied.
Figure 1B:
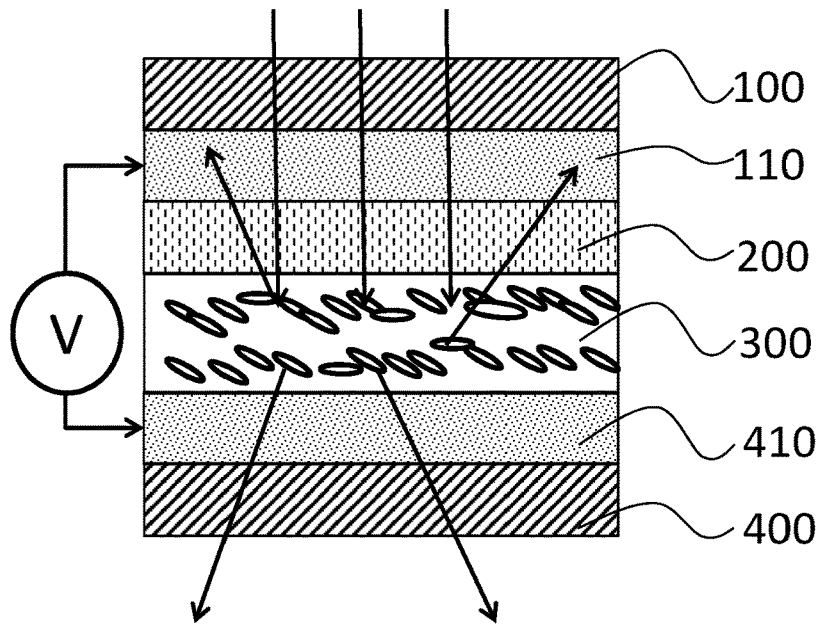

FIGS. 1A to 1B are cross-sectional views of the liquid crystal device of one preferred embodiment of the present invention before and after a predetermined voltage is applied. In the present disclosure, the present liquid crystal device exhibiting high transmittance in transparent state and low driving voltages suitable for reverse mode LC switchable display. As shown in FIG. 1A, the liquid crystal device of the present embodiment comprises a first substrate 100 with a first electrode layer 110 formed thereon, a second substrate 400 with a second electrode layer 410 formed thereon, a first alignment layer 200 and a liquid crystal layer 300.

The materials suitably used as the first substrate 100 and the second substrate 400 of the present liquid crystal device can be high transparent materials known in the related art without any particular limited. The materials can independently be, for example, a glass substrate or a plastic substrate. The plastic substrate can be made of common plastic materials, for example, triacetate cellulose (TAC), cyclo-olefin polymer (COP) of norbornene derivative, polymethylmethacrylate (PMMA), polycarbonate (PC), polyethylene (PE), polypropylene (PP), polyvinyl alcohol (PVA), diacetyl cellulose (DAC), polyacrylates (Pac), polyether sulfone (PES), polyetheretherketone (PEEK), polyphenylene sulfide (PPSU), polyetherimide (PEI), polyethylene naphthalate (PEN), poly (ethylene terephthalate) (PET), polyimide (PI), polysulfone (PSF), polyarylate (PAR) or amorphous fluorine resin, but not limited thereto.

The first conductive layer 110 of the first substrate 100 and the second conductive layer 410 of the second substrate 400 for driving the liquid motions of the liquid crystal molecules in the liquid crystal device can be formed by deposition, such as, by depositing a conduction polymer, a conductive metal, a conductive nanowire or indium-tin oxide (ITO) on the substrate. In one preferred embodiment of the present invention, the first substrate 100 and the second substrate 400 are both glass substrates, and the first conductive layer 110 and the second conductive layer 410 formed thereon are made of indium-tin oxide.

In one preferred embodiment of the present invention, a first alignment layer 200 is disposed on the first conductive layer 110 of the first substrate 100. The first alignment layer 200 comprises a liquid crystal alignment treating agent and a methacryloyloxy-containing silane.

The liquid crystal alignment treating agent can be oriented by radiation first, then the liquid crystal compounds are oriented in a predetermined direction via interaction therebetween, such as anisotropic interaction. The liquid crystal alignment treating agent can comprise a single-molecule compound, a monomer compound, an oligomer compound or a polymer. Suitable liquid crystal alignment treating agents can be but not limited to acrylic polymers, methacrylic polymers, novolak resins, polyhydroxystyrenes, polyimide precursors, polyimides, polyamides, polyesters, celluloses, polysiloxanes or the combinations thereof.

The addition of the methacryloyloxy-containing silane enables the first alignment layer 200 with orientation ability for liquid crystal, and the driving voltage of the liquid crystal device can be lowered and the high transmittance of the liquid crystal device can be maintained by forming chemical bonds between the reactive functional groups of the methacryloyloxy-containing silane and the reactive functional groups of the resin in the liquid crystal layer 300. Suitable methacryloyloxy-containing silane can be a silane with a methacryloyloxy group at one end and a siloxane group at the other end, for example, γ-methacryloxypropyl-trimethoxysilane, γ-methacryloxypropyl-triisopropoxysilane or γ-methacryloxypropyl-triethoxysilane.

In one preferred embodiment of the present invention, the first alignment layer 200 comprises 1 to 3 parts by weight of the methacryloyloxy-containing silane per 100 parts by weight of liquid crystal alignment treating agent. As the addition amount of the methacryloyloxy-containing silane is too low, the transmittance in transparent state of the LC device may not be maintained. However, as the addition amount of the methacryloyloxy-containing silane is too high, the orientation of the liquid crystal alignment treating agent will be affected.

In one preferred embodiment of the present invention, the first alignment layer 200 is formed by coating and cured the liquid crystal alignment treating agent and methacryloyloxy-containing silane on the first substrate 100. Before coating the liquid crystal alignment treating agent and the methacryloyloxy-containing silane, the liquid crystal alignment treating agent and the methacryloyloxy-containing silane can be dissolved in a solvent which can enhance the film-forming ability and leveling of the liquid crystal alignment treating agent coating. Suitable solvents can be the solvents which can dissolve the liquid crystal alignment treating agent, for example, 1-hexanol, cyclohexanol, 1,2-ethylene glycol, 1,2-propylene glycol, propylene glycol monobutylether, ethylene glycol butylether, dipropylene glycol dimethylether, cyclohexanone, cyclopentanone, N-methyl-pyrrolidone, N-ethyl-pyrrolidone, and γ-butyrolactone or the combinations thereof. In one preferred embodiment of the present invention, the solvent is ethylene glycol butylether and N-methyl-pyrrolidone, and the liquid crystal alignment treating agent is polyimide. The weight ratio of the solvent and the liquid crystal alignment treating agent coated on the first substrate 100 is about 94:6.

The liquid crystal layer 300 is disposed on the first alignment layer 200, which comprises a liquid crystal material and a bifunctional-group resin. Suitable liquid crystal materials can be any one which can maintain its orientation in the bifunctional-group resin without any particularly limitation, for example a smectic liquid crystal, a nematic liquid crystal, or a cholesteric liquid crystal. The orientation of the liquid crystal molecules can be changed by applying a predetermined voltage to switch the modes of liquid crystal device.

The bifunctional-group resin can be dissolved in the liquid crystal and polymerized in any reaction mode to produce cured resin. The bifunctional-group resin can increase the transmittance of the present liquid crystal device in absence of applied voltage. In one preferred embodiment of the present invention, the weight average molecular weight of the bifunctional-group resin is less than 400. Preferably, the weight average molecular weight of the bifunctional-group resin is in the range of 200 to 400. The use of the bifunctional-group resin with high weight average molecular weight will cause the white points in the transparent state of the LC device due to the poor dispersion thereof. The bifunctional-group resin can be 1,6-hexanediol diacrylate (HDDA), triethylene glycol diacrylate (TEGDA), 1,9-nonanediol diacrylate (1,9-NDDA), dipropylene glycol diacrylate (DPGDA), ethoxylated bisphenol A diacrylate (BPA4EODA), hydroxypivalylhydroxypivalatediacrylate (HPHPDA), polyethylene glycol, polyethyleneglycol (200) diacrylate (PEG(200)DA) or the likes and the combinations thereof. In one preferred embodiment of the present invention, the liquid crystal layer 300 comprises 7 to 9 parts by weight of bifunctional-group resin per 100 parts by weight of the liquid crystal layer 300. In one preferred embodiment of the present invention, the bifunctional-group resin can further blended with a photoinitiator known in the related art and not particularly limited.

When no voltage is applied, the liquid crystal molecules in the liquid crystal layer 300 of the liquid crystal device are vertically aligned in same direction due to the alignment of the first alignment layer 200. Thus, the incident light will pass through the liquid crystal device to exhibit transparent, as shown in FIG. 1A. When a certain voltage is applied, the liquid crystal molecules in the liquid crystal layer 300 of the liquid crystal device are randomly oriented. Thus, the incident light will be scattered and the device exhibits opaque, as shown in FIG. 1B.

Figure 2A:
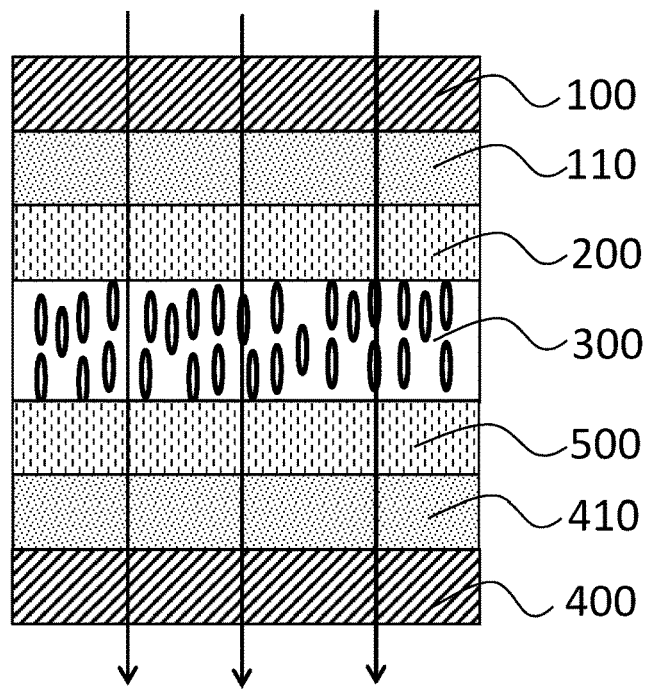
FIGS. 2A to 2B are cross-sectional views of the liquid crystal device of another preferred embodiment of the present invention before and after a predetermined voltage is applied.

In another preferred embodiment of the present invention, as shown in FIG. 2A, the liquid crystal device is similar to the device of the previous embodiment, comprising a first substrate 100 with a first electrode layer 110 formed thereon, a second substrate 400 with a second electrode layer 410 formed thereon, a first alignment layer 200 and a liquid crystal layer 300, and further comprising a second alignment layer 500 disposed between the second substrate 400 and the liquid crystal layer 300. The second alignment layer 500 of the liquid crystal alignment treating agent is formed by coating and curing on the second substrate 400. In a preferred embodiment of the present invention, the second alignment layer 500 is formed by coating and curing a liquid crystal alignment treating agent and a methacryloyloxy-containing silane on the second substrate 400.

Figure 2B:
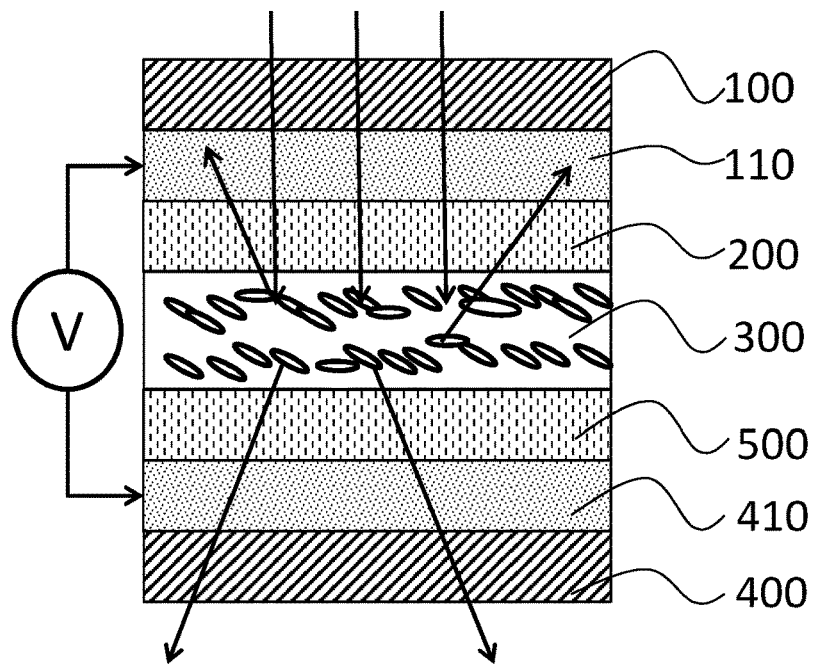

When no voltage is applied, the liquid crystal molecules in the liquid crystal layer 300 of the present liquid crystal device are vertically aligned in the same direction due to the alignment of the first alignment layer 200 and the second alignment layer 500. Thus, the incident light will pass through the liquid crystal device to exhibit transparent, as shown in FIG. 2A. When a certain voltage is applied, the liquid crystal molecules in the liquid crystal layer 300 of the liquid crystal device are randomly oriented. Thus, the incident light will not pass through the liquid crystal device and the device exhibits opaque, as shown in FIG. 2B.

The first alignment layer 200 and/or the second alignment layer 500 are endowed with alignment function to the liquid crystal molecules by the reactive functional group-containing silane thereof, and stable optical properties and high transmittance in the naturally transparent state of the liquid crystal device can be maintained by forming chemical bonds between the reactive functional groups and the bifunctional-group resin of the liquid crystal layer 300 after photo-curing. Consequently, the liquid crystal device can be driven by a lower voltage because less resin is added.

Accordingly, the liquid crystal device of the present invention can be driven by low voltage as the result of without increasing the amount of the resin in the liquid crystal layer 300 to maintain the transmittance in transparent state. The liquid crystal device of the present invention can be driven by a low voltage to obtain a stable transparent state or opaque state and exhibit a high transmittance in transparent state. Therefore, the present liquid crystal device can be applied to an optical modulator for being used as a smart window, a privacy protecting device for a window or a flexible display device, but not limited thereto.

The following Examples are presented to further illustrate and embody the present invention but not intended to limit to thereto.

Examples 1-4: Preparation of the Liquid Crystal Device

A polyimide solution (DA-9003, 6% of solid content, in the solvent of ethylene glycol and N-methyl-pyrrolidone, commercial available from Daxin Material, Taiwan) and γ-methacryloxypropyltrimethoxysilane (A-174NT, commercial available from Momentive Performance Materials, USA) were mixed in reference to the compositions listed in Table 1 and stirred. The stirred mixture was coated on an ITO transparent electrode layer over a glass (ITO glass) substrate and heated to 70° C. for 10 minutes and to 180° C. for 30 minutes to form an alignment layer on the ITO transparent electrode of the glass substrate.

A 1,6-hexanediol diacrylate (HDDA, weight average molecular weight of 226) blended with 0.18% of a photoinitiator and a liquid crystal compound (MJT510200, commercial available from HECHENG, China) were mixed in reference to the compositions listed in Table 1 to obtain a liquid crystal composition. Two ITO glasses with alignment layers formed thereon were provided. One ITO glass was coated with spacers on the alignment layer first, and subsequently dropped with liquid crystal composition by one drop filling (ODF) method thereon. Next, the alignment layer of another ITO glass was attached to the liquid crystal layer of the other ITO glass to assemble as a liquid crystal device.

Next, the liquid crystal device was radiated by UV radiation (TL-K 40 W, commercial available from Philips, Germany) to conduct aligning and curing treatment. The wavelength of the UV radiation is 350-400 nm and radiation time is 300 seconds.

Comparative Example 1-3: Preparation of the Liquid Crystal Device

The preparation procedures of the liquid crystal device of Comparative Examples 1-3 are the same as those of the Examples 1-4, except that the composition of the alignment layer and the composition of the liquid crystal layer.

TABLE 1

The detailed compositions of Examples 1-4 and Comparative Examples 1-3

| Example | Composition of the liquid crystal layer (parts by weight) | | Precursor of the alignment layer (parts by weight) | | |
|---|---|---|---|---|---|
| | Liquid crystal material | Bifunctional-group resin | Solvent | Alignment treating agent | Silane |
| Example 1 | 92.5 | 7.5 | 94 | 6 | 0.06 |
| Example 2 | 92.5 | 7.5 | 94 | 6 | 0.12 |
| Example 3 | 92 | 8 | 94 | 6 | 0.12 |
| Example 4 | 92 | 8 | 94 | 6 | 0.18 |
| Comparative Example 1 | 92.5 | 7.5 | 94 | 6 | 0 |
| Comparative Example 2 | 92 | 8.0 | 94 | 6 | 0 |
| Comparative Example 3 | 92.5 | 7.5 | 94 | 6 | 0.3 |

Test Methods of Film Forming Ability and Orientation

Two orthogonal polarizers were respectively disposed on two opposite sides of the liquid crystal device. The orientation of the liquid crystal was determined by the transparency of the liquid crystal device observed by eyes. The orientation of the liquid crystal is good when the appearance of the liquid crystal device is transparent, and the orientation of the liquid crystal is poor when the appearance of the liquid crystal device is not transparent.

Test Method of Optical Property

The transmittance of the liquid crystal device by the Spectrum Detective Transmission Meter (SD2400, commercially available from EDTM, USA) is determined in absence of applied voltage.

Test Method of Driving Voltage

The transmittance of the liquid crystal device by the Spectrum Detective Transmission Meter (SD2400, commercially available from EDTM, USA) is determined in the presence of applied 48V DC and 60V DC. The lower transmittance value means that the lower voltage is needed to drive the liquid crystal device.

The test results of Examples 1-4 and Comparative Examples 1-3 are shown in Table 2.

TABLE 2

The test results of Examples and Comparative Examples

| | Film forming ability/ Orientation | 0 V Visible-light transmittance | 48 V Visible-light transmittance | 60 V Visible-light transmittance |
|---|---|---|---|---|
| Example 1 | Good/Good | 78 | 12 | 7 |
| Example 2 | Good/Good | 80 | 12 | 7 |
| Example 3 | Good/Good | 81 | 16 | 9 |
| Example 4 | Good/Good | 81 | 16 | 9 |
| Comparative Example 1 | Good/Good | 75 | 14 | 11 |
| Comparative Example 2 | Good/Good | 79 | 20 | 11 |
| Comparative Example 3 | Good/Poor | N/A | N/A | N/A |

From the results of Examples 1-4 and Comparative Examples 1-3, the transmittance of Examples 1-4 is superior to that of Comparative Examples 1-2 in absence of applied voltage. However, as a certain voltage is applied, the transmittance of the embodiments of the present invention is lower than that of Comparative Example 1-2. Furthermore, the transmittance of Example 1 and Example 2 is 12 in the presence of applied 48V DC, the transmittance of Comparative Example 1 and Comparative Examples 2 is 11 in the presence of applied 60V DC. It is obvious that the liquid crystal device of the present invention can be driven to switch to opaque state by a lower voltage. The alignment of liquid crystal device in Comparative Example 3 is poor due to higher addition amount of silane in the alignment layer. The test results of the Examples and Comparative Examples indicate that the liquid crystal devices of the present invention require lower driving voltages and exhibit higher transmittance in absence of applied voltage.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A liquid crystal device, comprising:
   a first substrate with a first conductive layer formed thereon;
   a first alignment layer disposed on the first conductive layer of the first substrate, which comprises a liquid crystal alignment treating agent and a methacryloyloxy-containing silane;
   a liquid crystal layer disposed on the first alignment layer, wherein the liquid crystal layer comprises a liquid crystal material and a bifunctional-group resin; and
   a second substrate with a second conductive layer formed thereon disposed on the liquid crystal layer.

2. The liquid crystal device as claimed in claim 1, wherein the methacryloyloxy-containing silane is selected from one of the group consisting of γ-methacryloxypropyltrimethoxysilane, γ-methacryloxypropyltriisopropoxysilane and γ-methacryloxypropyltriethoxysilane, or the combination thereof.

3. The liquid crystal device as claimed in claim 1, wherein the alignment layer comprises 1 to 3 parts by weight of methacryloyloxy-containing silane per 100 parts by weight of the liquid crystal alignment treating agent.

4. The liquid crystal device as claimed in claim 1, wherein the liquid crystal alignment treating agent is selected from one of the group consisting of acrylic polymers, methacrylic polymers, novolak resins, polyhydroxystyrenes, polyimide precursors, polyimides, polyamides, polyesters, celluloses, and polysiloxanes or the combination thereof.

5. The liquid crystal device as claimed in claim 1, wherein the bifunctional-group resin is selected from one of the group consisting of 1,6-hexanediol diacrylate (HDDA), triethylene glycol diacrylate (TEGDA), 1,9-nonanediol diacrylate (1,9-NDDA), dipropylene glycol diacrylate (DPGDA), ethoxylated bisphenol A diacrylate (BPA4EODA), hydroxypivalylhydroxypivalatediacrylate (HPHPDA), and polyethyleneglycol (200) diacrylate (PEG (200)DA), or the combination thereof.

6. The liquid crystal device as claimed in claim 1, wherein the liquid crystal layer comprises 7 to 9 parts by weight of the bifunctional-group resin per 100 parts by weight of the liquid crystal layer.

7. The liquid crystal device as claimed in claim 1, wherein the weight average molecular weight of the bifunctional-group resin is less than 400.

8. The liquid crystal device as claimed in claim 1, wherein the bifunctional-group resin is further blended with a photoinitiator.

9. The liquid crystal device as claimed in claim 1, wherein the first substrate and the second substrate are independently a glass substrate or a plastic substrate.

10. The liquid crystal device as claimed in claim 1, further comprising a second alignment layer disposed between the second substrate and the liquid crystal layer.

* * * * *